US009070335B2

(12) United States Patent
Nakayasu

(10) Patent No.: US 9,070,335 B2
(45) Date of Patent: Jun. 30, 2015

(54) DISPLAY DEVICE

(75) Inventor: Youzou Nakayasu, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 141 days.

(21) Appl. No.: 13/296,259

(22) Filed: Nov. 15, 2011

(65) Prior Publication Data

US 2012/0119979 A1 May 17, 2012

(30) Foreign Application Priority Data

Nov. 17, 2010 (JP) ................................ 2010-257036

(51) Int. Cl.
*G02F 1/1333* (2006.01)
*G09G 3/36* (2006.01)

(52) U.S. Cl.
CPC ...... *G09G 3/3648* (2013.01); *G09G 2300/0426* (2013.01); *G09G 2330/04* (2013.01)

(58) Field of Classification Search
CPC . H05K 9/0067; H05K 1/0235; H05K 1/0259; H05K 1/026; H01L 23/58; H01L 23/60; H01L 27/0248; H01L 27/055
USPC ........................................................... 257/59
See application file for complete search history.

(56) References Cited

U.S. PATENT DOCUMENTS

| | | | | |
|---|---|---|---|---|
| 5,949,502 | A | 9/1999 | Matsunaga et al. | |
| 2004/0125256 | A1 | 7/2004 | Park et al. | |
| 2006/0145951 | A1 | 7/2006 | Watanabe et al. | |
| 2010/0123869 | A1 * | 5/2010 | Itakura et al. | 349/143 |

FOREIGN PATENT DOCUMENTS

| | | | | |
|---|---|---|---|---|
| JP | 11-95260 | | 4/1999 | |
| JP | 2003-043523 | | 2/2003 | |
| JP | 3429775 | | 5/2003 | |
| JP | 2004-126276 | | 4/2004 | |
| JP | 2004126276 | A * | 4/2004 | G02F 1/1345 |
| JP | 2004-212951 | | 7/2004 | |
| JP | 2004-317685 | | 11/2004 | |
| JP | 2006-517678 | | 7/2006 | |
| JP | 2007-094233 | | 4/2007 | |
| JP | 2008-53517 | | 3/2008 | |

OTHER PUBLICATIONS

Office Action in JP 2010-257036, dated Apr. 25, 2014, [English language translation only] (2 pgs).

* cited by examiner

*Primary Examiner* — Quan-Zhen Wang
*Assistant Examiner* — Chad Dicke
(74) *Attorney, Agent, or Firm* — Lowe Hauptman & Ham, LLP

(57) ABSTRACT

A display device includes an insulating substrate; a first conductive layer in which a first signal line and a second signal line are formed on the insulating substrate; an insulating layer provided in an upper layer of the first conductive layer; and a semiconductor layer, which is provided in an upper layer of the insulating layer, and in which a semiconductor film, which overlaps the first signal line and the second signal line in plan view, is formed.

5 Claims, 4 Drawing Sheets

DISPLAY DEVICE

CROSS-REFERENCE TO RELATED APPLICATION

The present application claims priority from Japanese application JP 2010-257036 filed on Nov. 17, 2010, the content of which is hereby incorporated by reference into this application.

BACKGROUND OF THE INVENTION

1. Field of the Invention

The present invention relates to a display device, and more particularly, to a display device including a plurality of pixel circuits provided on a substrate.

2. Description of the Related Art

In a display device including a plurality of pixel circuits formed on a planar substrate, a short circuit may occur by static electricity during manufacturing, and product failure may occur in some cases (hereinafter, this phenomenon is referred to as electrostatic discharge damage). For example, as a measure for preventing the electrostatic discharge damage in a liquid crystal display device, a bidirectional diode is provided between wiring lines which have possibility of being short-circuited.

Further, as another measure for preventing the electrostatic discharge damage, a resistor element may be used to connect a plurality of wiring lines which have possibility of being short-circuited, as disclosed in Japanese Patent No. 3429775.

The bidirectional diode and the resistor element provided between the wiring lines, which are used as conventional countermeasures against the electrostatic discharge damage, are formed of two conductive layers provided on the substrate and a semiconductor layer provided between the two conductive layers. In the manufacturing steps, the electrostatic discharge damage cannot be prevented until those elements are formed. Therefore, it is impossible to prevent the electrostatic discharge damage which occurs in a step of, for example, forming the upper conductive layer by sputtering. Further, the circuit design is greatly restricted.

SUMMARY OF THE INVENTION

The present invention has been made in view of the above-mentioned problem, and therefore has an object to provide a display device, which is capable of preventing electrostatic discharge damage with a simpler structure than providing a bidirectional diode or a resistor element.

Representative aspects of the invention disclosed herein are briefly outlined as follows.

(1) There is provided a display device, including: an insulating substrate; a first conductive layer in which a first signal line and a second signal line are formed on the insulating substrate; an insulating layer provided in an upper layer of the first conductive layer; and a semiconductor layer, which is provided in an upper layer of the insulating layer and in which a semiconductor film, which overlaps the first signal line and the second signal line in plan view, is formed, in which a distance between a portion of the first signal line, which is overlapped with the semiconductor film, and a portion of the second signal line, which is overlapped with the semiconductor film, is larger than a minimum distance between the first signal line and the second signal line.

(2) In the display device according to item (1), the distance between the portion of the first signal line, which is overlapped with the semiconductor film, and the portion of the second signal line, which is overlapped with the semiconductor film, is 1.2 times as large as the minimum distance between the first signal line and the second signal line or more.

(3) The display device according to item (1) or (2) further includes a second conductive layer in which a conductive film held in contact with an upper surface of the semiconductor film is provided.

(4) The display device according to any of items (1) to (3) further includes a plurality of pixel circuits each including a pixel electrode and a pixel switch, in which the first signal line is connected to a gate electrode of the pixel switch, and the second signal line is connected to a common electrode for applying an electric field to be generated between the common electrode and the pixel electrode to liquid crystal.

(5) In the display device according to any of items (1) to (3), at least one of the first signal line and the second signal line is not connected to a terminal, which is provided on the insulating substrate, for connecting to outside.

(6) There is provided a display device, including: an insulating substrate; a first conductive layer in which a first signal line and a second signal line are formed on the insulating substrate; an insulating layer provided in an upper layer of the first conductive layer; and a semiconductor layer, which is provided in an upper layer of the insulating layer and in which a semiconductor film, which overlaps the first signal line and the second signal line in plan view, is formed, in which the semiconductor film includes a first portion, which overlaps the first signal line in plan view, a second portion, which overlaps the second signal line in plan view, and a third portion, which is provided between the first portion and the second portion, the first portion, the second portion, and the third portion each having an upper surface which is not provided in contact with a conductive film.

According to the present invention, the electrostatic discharge damage can be prevented with a simpler structure than providing the bidirectional diode or the resistor element which connects the wiring lines.

DETAILED DESCRIPTION OF THE INVENTION

Hereinafter, an embodiment of the present invention is described with reference to the drawings. Throughout the description, the same reference symbols are attached to components having the same function, and redundant description thereof is omitted. Hereinafter, description is made of a case where the present invention is applied to an in-plane-switching (IPS) type liquid crystal display device as an example of a display device.

The liquid crystal display device according to the embodiment of the present invention includes a liquid crystal display panel. The liquid crystal display panel includes an array substrate, a filter substrate (also referred to as counter substrate), which is opposed to the array substrate and includes a color filter, a liquid crystal material sealed in a region sandwiched between both the substrates, and a driver integrated circuit mounted on the array substrate. The array substrate and the filter substrate are each an insulating substrate such as a glass substrate.

Figure 1:
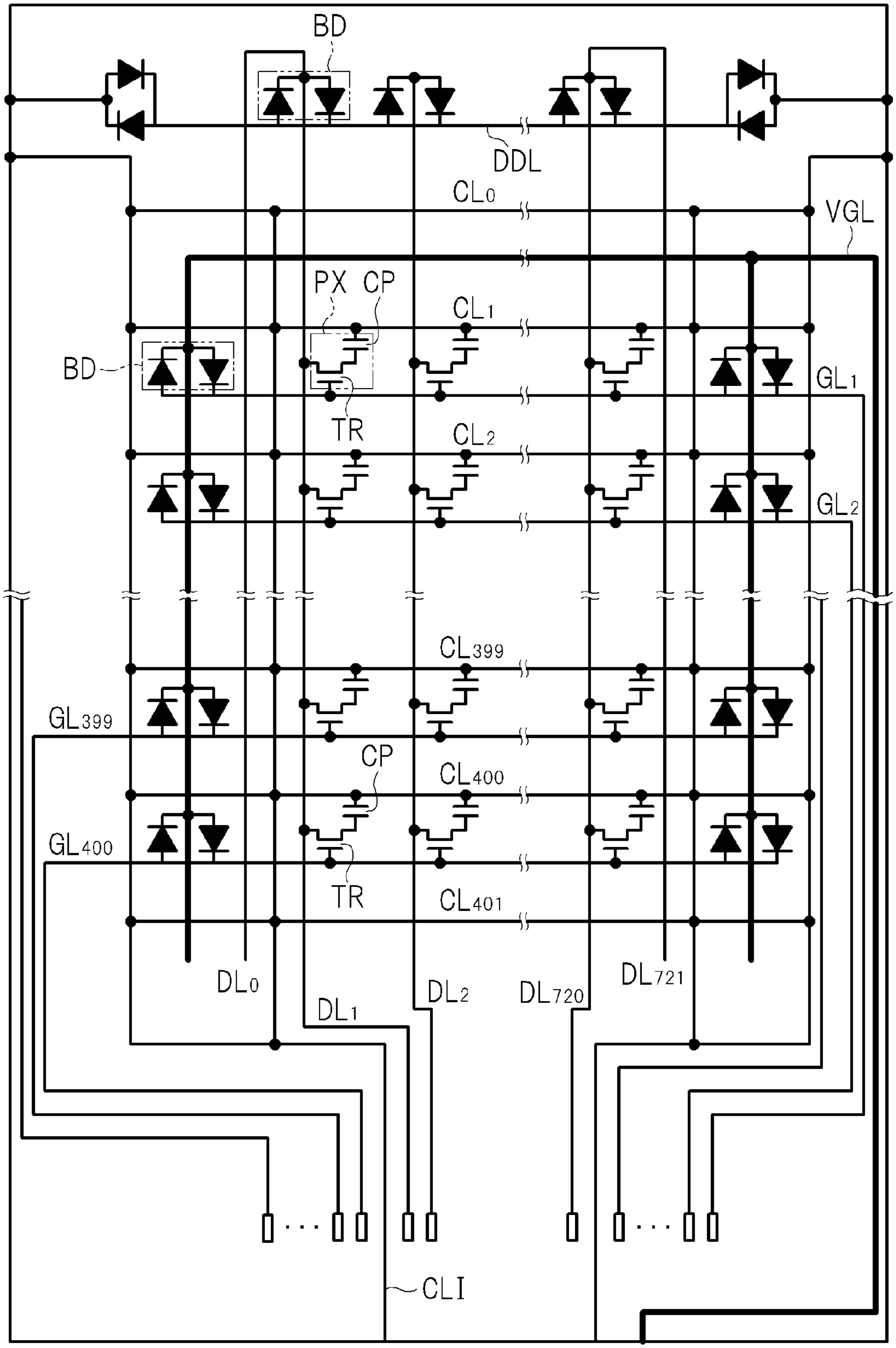
FIG. 1 is a circuit diagram illustrating an equivalent circuit of a liquid crystal display panel according to an embodiment of the present invention.

FIG. 1 is a circuit diagram illustrating an equivalent circuit of the liquid crystal display panel according to the embodiment of the present invention. On the array substrate of the liquid crystal display panel, there are arranged a plurality of pixel circuits PX, which are arranged in matrix to form a display region, a plurality of gate lines GL and common lines CL extending within the display region in the lateral direction of FIG. 1, and a plurality of drain lines DL extending within the display region in the vertical direction of FIG. 1. The number of the pixel circuits PX to be arranged corresponds to the resolution of the liquid crystal display device. In the example of this embodiment, the resolution is 240×400, and further, one pixel is displayed by three pixel circuits PX, which display red, blue, and green, respectively, and are arranged in the lateral direction. Therefore, within the display region of the liquid crystal display panel, the pixel circuits PX of 720×400 are arranged. Note that, a portion of the array substrate outside the display region is referred to as a peripheral region.

The drain lines DL are provided for respective columns of the pixel circuits PX, and the gate lines GL and the common lines CL are provided for respective rows of the pixel circuits PX. Hereinafter, the n-th gate line is represented by $GL_n$, the n-th common line is represented by $CL_n$, and the m-th drain line is represented by $DL_m$. Within the display region, based on the number of rows of the pixel circuits PX, 400 gate lines GL from $GL_1$ to $GL_{400}$ and 400 common lines CL from $CL_1$ to $CL_{400}$ are provided. In addition, outside the display region, dummy common lines $CL_0$ and $CL_{401}$ are provided. Further, within the display region, based on the number of columns of the pixel circuits PX, 720 drain lines DL from $DL_1$ to $DL_{720}$ are provided. In addition, outside the display region, dummy drain lines $DL_0$ and $DL_{721}$ are provided, which are electrically connected to the drain lines $DL_1$ and $DL_{720}$, respectively. Note that, the gate lines GL, the drain lines DL, and the common lines CL respectively extend from outside to inside of any of ends of the display region on the upper, lower, right, and left sides, and further extend from inside to outside of ends on the opposite sides of the any of ends.

Each of the pixel circuits PX includes a pixel capacitor CP and a pixel switch TR. The pixel capacitor CP is formed of a pixel electrode, a common electrode, and liquid crystal sandwiched between the pixel electrode and the common electrode. The pixel switch TR is a thin film transistor, and has a source electrode connected to the pixel electrode and a drain electrode connected to the drain line DL corresponding to this pixel circuit PX. Note that, polarities are not structurally fixed in a thin film transistor like the pixel switch TR, and the source electrode and the drain electrode of the thin film transistor are determined depending on the direction of the current flowing through the thin film transistor and the type (n-channel type or p-channel type) of the thin film transistor. Therefore, the electrode connected to the drain line DL may be the source electrode and the electrode connected to the pixel electrode may be the drain electrode. The common electrode is connected to the common line CL corresponding to the pixel circuit PX. An electric field is generated between the common electrode and the pixel electrode depending on the electric charges stored in the pixel capacitor CP. The electric field changes the degree of polarization of light transmitting the liquid crystal layer. In accordance with the degree of polarization, each pixel circuit displays gray level.

In portions of the peripheral region on the left side and the right side of the display region, ground lines VGL extend in the vertical direction of FIG. 1. Each of the gate lines GL intersects the ground lines VGL on the left side and the right side of the display region in plan view. Further, bidirectional diodes BD are respectively provided correspondingly to the intersecting portions. The bidirectional diode BD is provided so as to connect the gate line GL and the ground line VGL forming the corresponding intersecting portion. The two ground lines VGL are connected to each other, and those ground lines are also connected to a terminal for supplying a predetermined potential from outside the liquid crystal panel. Further on the left side of the ground line VGL on the left side of the display region, and further on the right side of the ground line VGL on the right side of the display region, a shared common line CLI extends in the vertical direction of FIG. 1. Each of the common lines CL intersects the ground lines VGL on the left side and the right side of the display region in plan view, and further, is connected to the shared common line CLI. The shared common line CLI is connected to a terminal for supplying a common potential from outside the liquid crystal panel. Further, in a portion of the peripheral region on the upper side of the display region, a drain discharge line DDL extends in the lateral direction of FIG. 1. The drain discharge line DDL intersects each of the drain lines DL, and the drain discharge line DDL and each of the drain lines DL are connected to each other via the bidirectional diode BD. The drain discharge line DDL is connected to the shared common line CLI via the bidirectional diode BD.

Figure 2:
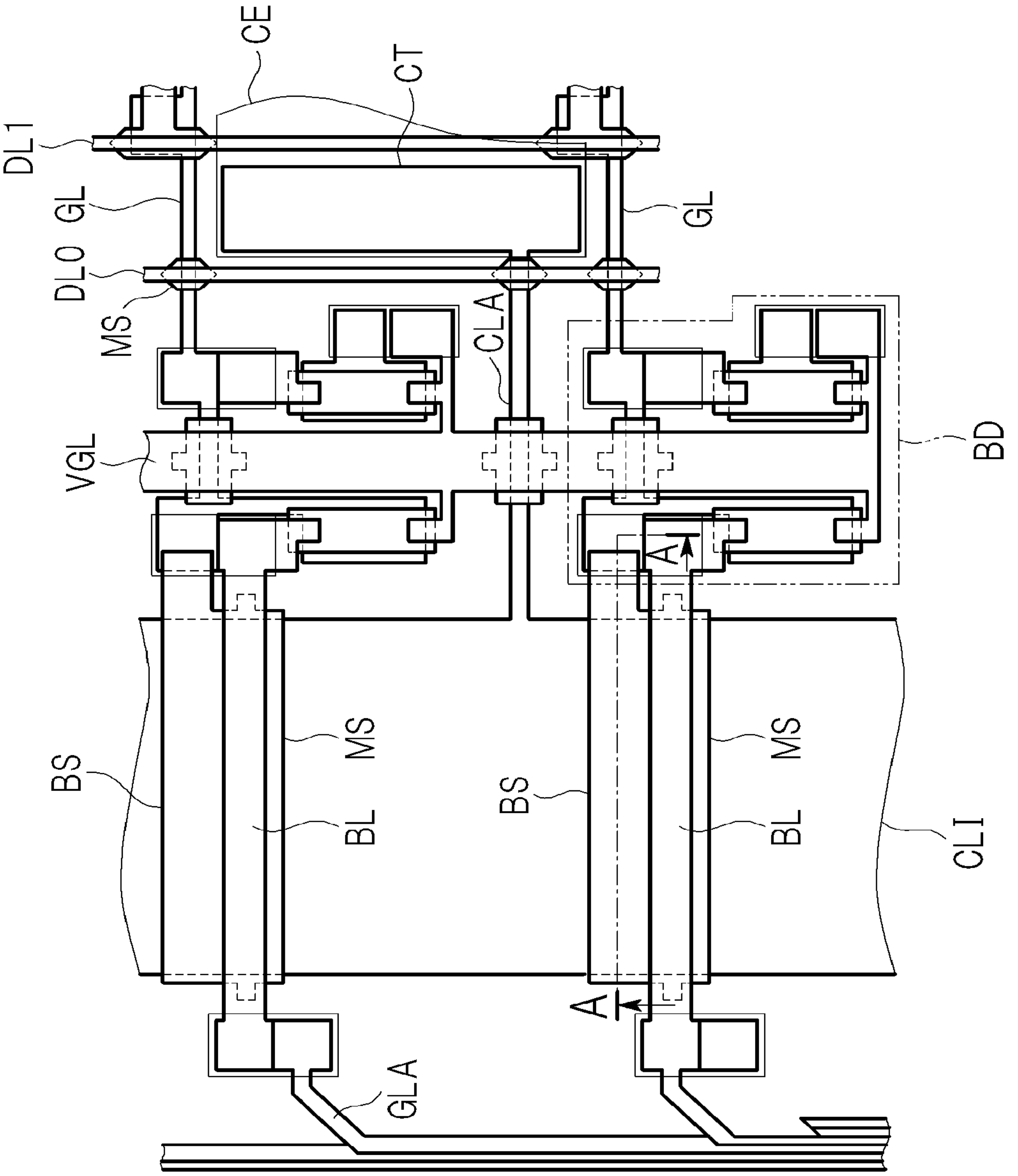
FIG. 2 is a partial plan view illustrating an example of a structure of a peripheral region of the liquid crystal display panel.
Figure 3:
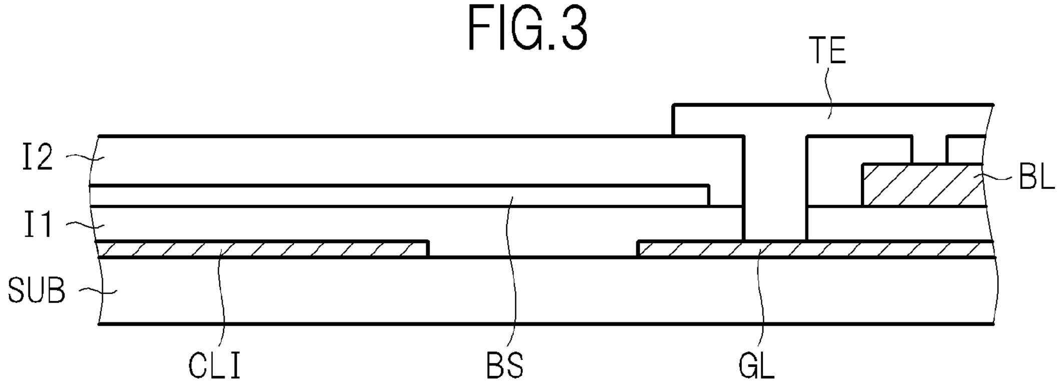
FIG. 3 is a sectional view cut along the line A-A of FIG. 2.

FIG. 2 is a partial plan view illustrating an example of the structure of the peripheral region of the liquid crystal display panel, specifically, an enlarged view of a portion on the left side of the display region. Further, FIG. 3 is a sectional view cut along the line A-A of FIG. 2. In a portion of the peripheral region on the left side, the shared common line CLI extends in the vertical direction of FIG. 2. The gate line GL extends in the lateral direction of FIG. 2 to reach almost the shared common line CLI outside the display region. Further, the gate lines GL intersect the ground line VGL extending in the vertical direction of FIG. 2 in plan view. In the periphery at the portions at which the ground line VGL and the gate lines GL intersect each other, the bidirectional diodes BD are provided one by one to respective rows of the pixel circuits PX. The bidirectional diode BD is formed by combining two thin film transistors (hereinafter, referred to as discharge transistors) in a diode-connected state. One of the discharge transistors is arranged on the left side of the ground line VGL in FIG. 2, and the other thereof is arranged on the right side of the ground line VGL in FIG. 2. The left discharge transistor has a gate electrode connected to a portion of the gate line GL immediately on the left of the portion at which the gate line GL intersects the ground line VGL, the gate electrode further being connected to a drain electrode of the left discharge transistor. The right discharge transistor has a gate electrode connected to the ground line VGL via an inter-layer crossing structure, the gate electrode further being connected to a drain electrode of the right discharge transistor via the inter-layer crossing structure.

The end portion of the gate line GL close to the shared common line CLI is expanded, and this end portion has a rectangular shape. On an end side of the array substrate relative to the shared common line CLI in plan view, (in FIG. 2, left side, hereinafter, referred to as outside), 400 gate connection lines GLA extend in the vertical direction of FIG. 2, which are provided correspondingly to the respective gate lines GL. The gate line GL and the corresponding gate connection line GLA are connected to each other with a bridge wiring line BL provided across the shared common line CLI.

At the left end of the display region, the drain line $DL_1$ extends in the vertical direction, and the dummy drain line $DL_0$ extends on the left side of the drain line $DL_1$. Between the drain line $DL_1$ and the dummy drain line $DL_0$, a common electrode connection terminal CT is provided for each row of the pixel circuits PX. The common electrode connection terminal CT has a rectangular shape in plan view. The common electrode connection terminal CT has a fixed interval with respect to the dummy drain line $DL_0$ and the drain line $DL_1$, which are provided on the left and right sides, respectively, of the common electrode connection terminal CT, and also has a fixed interval with respect to the gate lines GL arranged on the upper and lower sides, respectively, of the common electrode connection terminal CT. The common electrode connection terminal CT and the shared common line CLI are connected to each other via a common connection line CLA extending straight in the lateral direction. Within the display region, the pixel circuit PX is arranged in a region surrounded by adjacent two gate lines GL and adjacent two drain lines DL, and the pixel switch TR is provided at a lower left portion of the region in plan view.

In each of the pixel circuits PX, the drain electrode of the pixel switch TR is connected to the drain line DL corresponding to the pixel circuit PX, and the source electrode of the pixel switch TR is connected to the pixel electrode included in the pixel circuit PX. In FIG. 2, the drain electrode is a part of the drain line DL. Further, the drain electrode of the discharge transistor on the left side of the ground line VGL is connected to the bridge wiring line BL in the same layer, and the source electrode thereof is connected to the ground line VGL in the same layer. The drain electrode of the discharge transistor on the right side of the ground line VGL is connected to the ground line VGL in the same layer, and the source electrode thereof is connected to the gate line GL adjacent on the upper side of FIG. 2 via the inter-layer crossing structure.

Here, the gate line GL, the shared common line CLI, the common electrode connection terminal CT, the common connection line CLA, and the gate electrode of the discharge transistor are formed in a first conductive layer on an insulating substrate SUB. In an upper layer of the first conductive layer, a first insulating layer I1 formed of a gate insulating film of SiN is provided. In a semiconductor layer provided in an upper layer of the first insulating layer I1, a bridge semiconductor film BS, a channel semiconductor film CS, and an inter-wiring semiconductor film MS are formed. In this embodiment, the semiconductor films in the semiconductor layer are made of amorphous silicon (aSi). Further, in a second conductive layer (source/drain layer) provided in an upper layer of the semiconductor layer, the drain line DL, the ground line VGL, the source electrodes and drain electrodes of the discharge transistor and the pixel switch TR, and the bridge wiring line BL are formed.

The bridge semiconductor film BS overlaps the shared common line CLI and the end portion of the gate line GL in plan view. More specifically, the bridge semiconductor film BS extends in the lateral direction of FIG. 2, which is a direction intersecting the shared common line CLI, and extends from outside relative to the shared common line CLI across the shared common line CLI to reach a part of the end portion of the gate line GL. Meanwhile, in plan view, below the bridge semiconductor film BS, the bridge wiring line BL extends in the lateral direction of FIG. 2 while intersecting the shared common line CLI. A left end of the bridge wiring line BL is connected to the gate connection line GLA. The inter-layer crossing structure is provided adjacent on the right side of a portion at which the bridge semiconductor film BS overlaps the end portion of the gate line GL, and the end portion of the gate line GL is connected to a right end portion of the bridge wiring line BL via a transparent electrode. The right end portion of the bridge wiring line BL is connected to one end of the channel semiconductor film CS of the left discharge transistor. To the gate connection line GLA, a signal for driving the gate line GL is supplied from a terminal connected to the outside of the array substrate.

At the portion at which the shared common line CLI is overlapped with the bridge wiring line BL in plan view, the inter-wiring semiconductor film MS is provided between the two wiring layers. The inter-wiring semiconductor film MS is formed so as to prevent disconnection of the bridge wiring line BL provided in contact with the upper surface of the inter-wiring semiconductor film MS. The inter-wiring semiconductor film MS is shaped so that a protrusion is provided to a shape in which a region at which the bridge wiring line BL overlaps the shared common line CLI in plan view is expanded toward outside with a constant width. The protrusion is provided in a region at which, in plan view, the shared common line CLI is absent in the lower layer and the bridge wiring line BL is provided in the upper layer. The protrusion is provided so as to prevent disconnection of the bridge wiring line BL. Note that, in the example of FIG. 2, the inter-wiring semiconductor film MS and the bridge semiconductor film BS are provided in contact with each other in plan view, and are apparently integrated with each other. The inter-wiring semiconductor film MS is also formed at portions at which the gate line GL and the common connection line CLA intersect the ground line VGL in plan view, and at portions at which the drain line DL and the gate line GL intersect each other. The channel semiconductor film CS is provided for each of the discharge transistors and the pixel switches TR, and overlaps the gate electrode thereof in plan view. Further, upper surfaces of both end portions of the channel semiconductor film CS are provided in contact with the drain electrode and the source electrode of the each of the discharge transistors and the pixel switches TR.

In an upper layer of the source/drain layer, a second insulating layer I2 is provided, in which an inter-layer insulating film is formed. In an upper layer of the second insulating layer I2, a transparent electrode film TE is provided. The transparent electrode film TE is made of indium tin oxide (ITO). The transparent electrode film TE is used as the pixel electrode, a common electrode line CE, and the inter-layer crossing structure. The inter-layer crossing structure specifically includes: a contact hole, which is formed from the second insulating layer I2 to reach an upper surface of an electrode film (for example, the gate line GL) in the first conductive layer; a contact hole, which is provided adjacent to the above-mentioned contact hole and formed from the second insulating layer I2 to reach an upper surface of an electrode film (for example, the bridge wiring line BL) in the second conductive layer; and the transparent electrode film TE, which is formed in an upper layer of the second insulating layer and provided in contact with the respective electrode films of the first and second conductive layers at bottom portions of the contact holes. Further, the common electrode connection terminal CT is connected to the common electrode line CE provided in the same layer of the transparent electrode film TE. Note that, the common electrode line CE, the common electrode connection terminal CT, and the common connection line CLA correspond to the common line CL of FIG. 1. Further, the shared common line CLI and the common line CL are wiring lines formed in the same layer in an electrically-connected state, and hence can be assumed as one wiring line.

Figure 4:
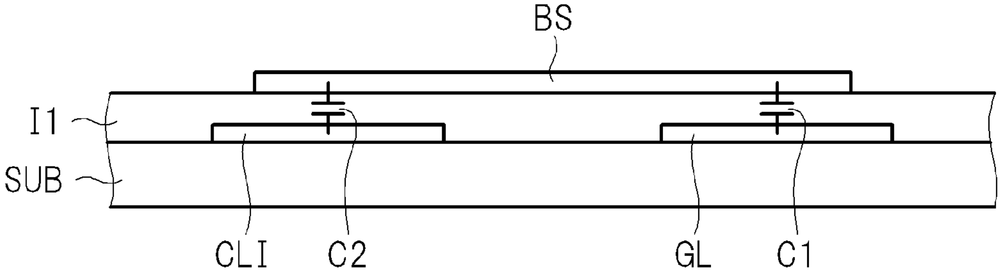
FIG. 4 is a view schematically illustrating an example of a relationship among a bridge semiconductor film, a gate line and a shared common line.
Figure 5:
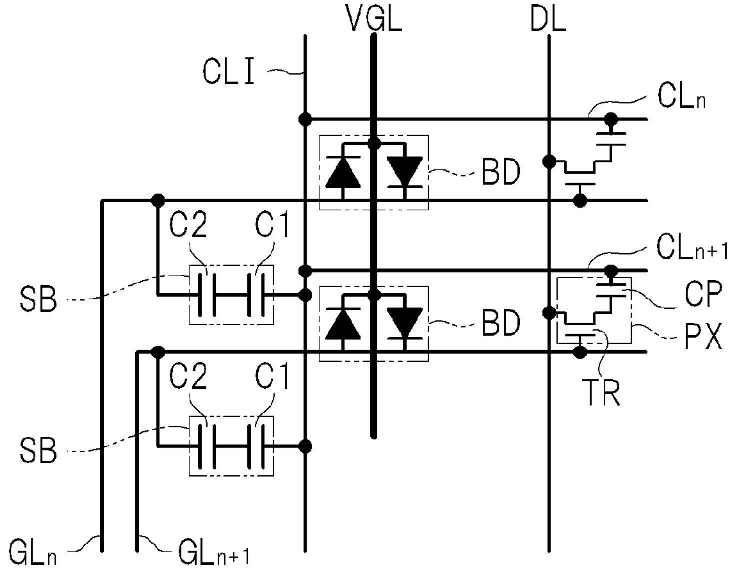
FIG. 5 is a diagram illustrating an equivalent circuit of an aSi bridge structure.

FIG. 4 is a view schematically illustrating a relationship among the bridge semiconductor film BS, the gate line GL and the shared common line CLI. Between the gate line GL and the bridge semiconductor film BS, an electrostatic capacitance C1 is generated. Between the shared common line CLI and the bridge semiconductor film BS, an electrostatic capacitance C2 is generated. This structure is referred to as an aSi bridge structure. FIG. 5 is a diagram illustrating an equivalent circuit of the aSi bridge structure. The electrostatic capacitances C1 and C2 are provided in series between the shared common line CLI and the gate line GL. With this structure, it is understood that the common line CL and the gate line GL are in relation to each other. Here, as illustrated in FIG. 4, the first insulating layer I1, which is provided between the gate line GL as well as the shared common line CLI and the bridge semiconductor film BS, is a thin film that is very thin. Therefore, even with a potential difference lower than that which causes the electrostatic discharge damage, a current flows between the bridge semiconductor film BS and the gate line GL and between the bridge semiconductor film BS and the shared common line CLI via the first insulating layer I1. In other words, the aSi bridge structure functions as a high resistance element. With this, the electric charges stored in the gate line GL or the common line CL at the time of manufacturing are discharged with the aSi bridge structure, to thereby prevent the electrostatic discharge damage between the gate line GL and the common line CL. Further, if the bridge semiconductor film BS is formed, the effect can be obtained even before a conductive film in the second conductive layer is formed, and hence the electrostatic discharge damage can be prevented even in the middle of the manufacturing of the second conductive layer.

Here, it is desired that a distance between the gate line GL and the shared common line CLI at a portion at which the aSi bridge structure exists be a distance in which the electrostatic discharge damage can be prevented when it is assumed that there is no aSi bridge structure. The distance between the gate line GL and the shared common line CLI at a portion at which the aSi bridge structure is, more specifically, a distance between a portion of the gate line GL which is overlapped with the bridge semiconductor film BS and a portion of the shared common line CLI which is overlapped with the bridge semiconductor film BS The above-mentioned distance is preferred to be larger than at least a minimum distance between the common connection line CLA as well as the common electrode connection terminal CT and the gate line GL, and is more preferred to be 1.2 times as large as the minimum distance or more. Note that, the aSi bridge structure may be applied not only between the gate line GL and the shared common line CLI, but also between other wiring lines. Further, the semiconductor film is not limited to that overlapping two wiring lines in plan view, and may overlap three or more wiring lines.

Meanwhile, the aSi bridge structure is formed between the wiring lines at which the electrostatic discharge damage is likely to occur, but the aSi bridge structure itself is not required to be formed at the position at which the electrostatic discharge damage is likely to occur. Further, the shape of the aSi bridge structure can be designed considerably freely. As a result, even with respect to wiring lines for which measures of the conventional method cannot be taken, the measure of preventing the electrostatic discharge damage can be taken. For example, when the above-mentioned bridge structure is used, the effect of preventing the electrostatic discharge damage can be obtained even with respect to floating wiring. The floating wiring refers to wiring, which is not connected to the ground terminal on the insulating substrate SUB. Conventionally, in the manufacturing steps, by dissipating (grounding) the electric charges outside the liquid crystal display panel, the electrostatic discharge damage has been prevented. This is performed by connecting the outside ground wiring to the ground terminal during the manufacturing steps, and by supplying a reference potential from the ground wiring. The floating wiring cannot be supplied with the reference potential by the above-mentioned method, and hence it has been impossible to prevent the electrostatic discharge damage in the conventional floating wiring.

Figure 6:
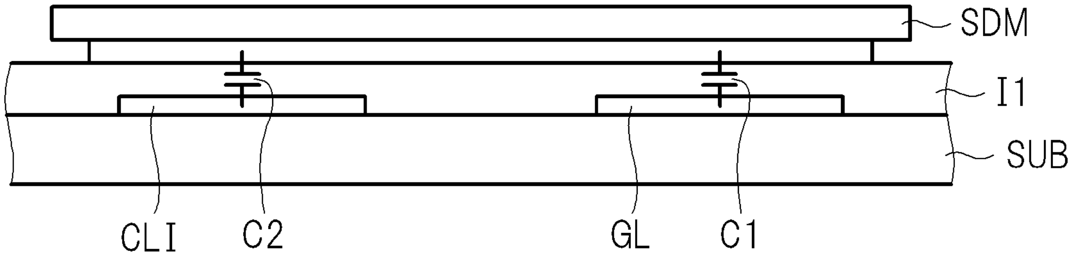
FIG. 6 is a view schematically illustrating another example of the relationship among the bridge semiconductor film, the gate line and the shared common line.

Further, even in a structure in which a conductive film SDM of the source/drain layer is provided in contact with the upper surface of the bridge semiconductor film BS, the effect of preventing the electrostatic discharge damage can be obtained. FIG. 6 is a view schematically illustrating another example of the relationship among the bridge semiconductor film BS, the gate line GL and the shared common line CLI. Unlike the example illustrated in FIG. 4, in plan view, the conductive film SDM of the source/drain layer is formed, which is provided in contact with upper surfaces of three portions of the bridge semiconductor film BS, that is, a first portion which overlaps the gate line GL, a second portion which overlaps the shared common line CLI, and a third portion provided between the first portion and the second portion. Note that, in a sense of increasing the resistance between the wiring lines, it is better not to form the above-mentioned conductive film SDM of the source/drain layer.

In the following, description is made of a summary of the steps of manufacturing the liquid crystal display device described above. First, on the insulating substrate SUB, the first conductive layer including the gate line GL and the shared common line CLI is formed. Here, the insulating substrate SUB is a transparent substrate such as a glass substrate. In this step, a metal to serve as the gate line GL or the like, for example, a high melting point metal such as molybdenum, tungsten, or tantalum, or an alloy thereof is deposited, and patterned by photolithography and etching, to thereby form the gate line GL or the like.

Next, the first insulating layer I1 is formed so as to cover the electrode film of the first conductive layer. The first insulating layer I1 is made of, for example, silicon nitride, and is formed by a CVD method and the like. Then, a semiconductor layer containing amorphous silicon (aSi) is sequentially formed. Next, the semiconductor layer is pattered by photolithography and etching, to thereby form the semiconductor film. As a method of the etching, for example, plasma ions using a fluorocarbon based gas or the like are employed.

Next, for example, a metal such as aluminum or an alloy thereof is deposited by sputtering, to thereby form a metal film of the second conductive layer. After that, the ground line VGL or the like is formed by photolithography and etching. Next, for example, silicon nitride is deposited by a CVD method as the second insulating layer I2. After the contact hole or the like is formed, the transparent electrode film TE is formed and patterned. An insulating film is further formed thereon, and the contact hole or the like is formed. After that, the pixel electrode is formed, to thereby form a pixel circuit or a circuit in the peripheral region of the IPS type.

Note that, application of the present invention is not limited to the IPS type liquid crystal display device. The present invention is also applicable to twisted nematic (TN) type or vertical alignment (VA) type liquid crystal display devices. This is because, even in liquid crystal display devices of types other than the IPS type, similar electrostatic discharge damage may occur between the wiring lines on the substrate, and further, thin film transistors are included, and hence it is possible to form a semiconductor film which overlaps both of the two wiring lines which may cause electrostatic discharge damage. Note that, the semiconductor film in not required to be made of amorphous silicon.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:

an insulating substrate;

a first conductive layer including a first signal line, a second signal line and a third signal line which are all formed with the first conductive layer, on the insulating substrate, so that the first, second and third signal lines are all in the same conductive layer, said first, second and third signal lines being adjacent a display area formed on the insulating substrate, the second signal line being located between the display area and the first signal line, and the first signal line being located between the display area and the third signal line, an insulating layer provided on an upper layer of the first conductive layer; and a semiconductor layer, which is provided on an upper layer of the insulating layer and in which a semiconductor film, which overlaps the first signal line and the second signal line in plan view, is formed, wherein the second signal line and the third signal line are electrically connected to each other, across the first signal line, by a conductive layer provided over a portion of the semiconductor layer, wherein the distance between a portion of the first signal line, which is overlapped with the semiconductor film, and a portion of the second signal line, which is overlapped with the semiconductor film, is larger than a minimum distance among distances between the first signal line and the second signal line, wherein the semiconductor layer and the second signal line overlap in a different area from an area in which the second signal line and the conductive layer provided over the portion of the semiconductor layer overlap, and wherein the conductive layer provided over the portion of the semiconductor layer is electrically connected to the second signal line through a transparent conductive film.

2. The display device according to claim 1, further comprising a second conductive layer in which a conductive film held in contact with an upper surface of the semiconductor film is provided.

3. The display device according to claim 1, further comprising a plurality of pixel circuits each including a pixel electrode and a pixel switch, wherein the first signal line is connected to a gate electrode of the pixel switch, and wherein the second signal line is connected to a common electrode for applying an electric field to be generated between the common electrode and the pixel electrode to liquid crystal.

4. The display device according to claim 1, wherein the distance between the portion of the first signal line, which is overlapped with the semiconductor film, and the portion of the second signal line, which is overlapped with the semiconductor film, is 1.2 times as large as a minimum distance among distances between the first signal line and the second signal line or more.

5. The display device according to claim 1, wherein a plurality of the second signal lines are arranged in a direction orthogonal to the first signal line, wherein a plurality of the semiconductor films which respectively correspond to the plurality of the second signal are separated from each other.

* * * * *